(12) United States Patent
Loomis et al.

(10) Patent No.: US 7,797,064 B2
(45) Date of Patent: Sep. 14, 2010

(54) APPARATUS AND METHOD FOR SKIPPING SONGS WITHOUT DELAY

(76) Inventors: Stephen Loomis, 2961 Silverplume Dr., Fort Collins, CO (US) 80526; Mangesh Madhukar Gondhalekar, 35 Colleen Way, Campbell, CA (US) 95008

( * ) Notice: Subject to any disclaimer, the term of this patent is extended or adjusted under 35 U.S.C. 154(b) by 0 days.

(21) Appl. No.: 10/688,423

(22) Filed: Oct. 16, 2003

(65) Prior Publication Data

US 2004/0138948 A1    Jul. 15, 2004

Related U.S. Application Data

(60) Provisional application No. 60/433,734, filed on Dec. 13, 2002.

(51) Int. Cl.
*G06F 17/00* (2006.01)
(52) U.S. Cl. .................................. 700/94
(58) Field of Classification Search ............... 700/94
See application file for complete search history.

(56) References Cited

U.S. PATENT DOCUMENTS

| | | | |
|---|---|---|---|
| 5,168,481 A | 12/1992 | Culbertson et al. ............. | 369/2 |
| 5,325,238 A | 6/1994 | Stebbings et al. | |
| 5,517,672 A | 5/1996 | Reussner et al. | |
| 5,528,513 A | 6/1996 | Vaitzblit et al. | |
| 5,585,866 A | 12/1996 | Miller et al. | |
| 5,616,876 A | 4/1997 | Cluts ........................... | 84/609 |
| 5,644,715 A | 7/1997 | Baugher | |
| 5,671,195 A | 9/1997 | Lee | |
| 5,715,314 A | 2/1998 | Payne et al. | |
| 5,734,119 A | 3/1998 | France et al. | |
| 5,761,417 A | 6/1998 | Henley et al. | |
| 5,774,672 A | 6/1998 | Funahashi et al. | |

(Continued)

FOREIGN PATENT DOCUMENTS

EP    0 831 608 A2    3/1998

(Continued)

OTHER PUBLICATIONS

Alghoniemy, M. et al.; *A Network Flow Model for Playlist Generation*; Department of Electrical Engineering, University of Minnesota.

(Continued)

*Primary Examiner*—Andrew C Flanders
(74) *Attorney, Agent, or Firm*—Schwabe, Williamson & Wyatt, P.C.

(57) ABSTRACT

In an Internet based personalized radio, where a user has a pre-selected list of songs to be played in a particular order, the invention provides an apparatus and method allowing the user to skip one or more songs without having an unintended delay between skips. This is accomplished by pre-buffering the first ten seconds of each of the next several songs on the list so that, should the user choose to skip to any of the next several songs, the pre-buffered ten seconds of the target song is already available to be played. The apparatus starts to play the pre-buffered port of the target song and starts to download the rest of it at the same time. Because the initial buffering time for the rest of the target song is less than ten seconds, the target song is played smoothly.

29 Claims, 7 Drawing Sheets

U.S. PATENT DOCUMENTS

| | | | |
|---|---|---|---|
| 5,784,597 A | 7/1998 | Chiu et al. | |
| 5,787,482 A | 7/1998 | Chen et al. | |
| 5,790,174 A | 8/1998 | Richard, III et al. | |
| 5,792,971 A | 8/1998 | Timis et al. | 84/609 |
| 5,802,502 A | 9/1998 | Gell et al. | |
| 5,819,160 A | 10/1998 | Foladare et al. | 455/45 |
| 5,892,900 A | 4/1999 | Ginter et al. | |
| 5,907,827 A | 5/1999 | Fang et al. | |
| 5,910,987 A | 6/1999 | Ginter et al. | |
| 5,913,039 A | 6/1999 | Nakamura et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,930,765 A | 7/1999 | Martin | |
| 5,943,422 A | 8/1999 | Van Wie et al. | |
| 5,944,778 A | 8/1999 | Takeuchi et al. | |
| 5,949,876 A | 9/1999 | Ginter et al. | |
| 5,956,321 A | 9/1999 | Yao et al. | |
| 5,956,491 A | 9/1999 | Marks | |
| 5,959,945 A | 9/1999 | Kleiman | |
| 5,963,914 A | 10/1999 | Skinner et al. | 705/11 |
| 5,982,891 A | 11/1999 | Ginter et al. | |
| 5,991,867 A | 11/1999 | Fosmark | |
| 5,996,015 A | 11/1999 | Day et al. | |
| 6,029,257 A | 2/2000 | Palmer | 714/40 |
| 6,031,797 A | 2/2000 | Van Ryzin et al. | 369/33 |
| 6,041,354 A | 3/2000 | Biliris et al. | |
| 6,044,398 A | 3/2000 | Marullo et al. | 709/219 |
| 6,061,722 A | 5/2000 | Lipa et al. | 709/224 |
| 6,067,562 A | 5/2000 | Goldman | 709/206 |
| 6,088,722 A | 7/2000 | Herz et al. | |
| 6,112,023 A | 8/2000 | Dave et al. | |
| 6,112,181 A | 8/2000 | Shear et al. | |
| 6,138,119 A | 10/2000 | Hall et al. | |
| 6,157,721 A | 12/2000 | Shear et al. | |
| 6,157,940 A | 12/2000 | Marullo et al. | 709/22 |
| 6,160,812 A | 12/2000 | Bauman et al. | |
| 6,163,683 A | 12/2000 | Dunn et al. | |
| 6,168,481 B1 | 1/2001 | Mardikian | |
| 6,173,325 B1 | 1/2001 | Kukreja | |
| 6,185,683 B1 | 2/2001 | Ginter et al. | |
| 6,185,701 B1 | 2/2001 | Marullo et al. | 714/38 |
| 6,192,340 B1 | 2/2001 | Abecassis | 704/270 |
| 6,195,701 B1 | 2/2001 | Kaiserswerth et al. | |
| 6,199,076 B1 | 3/2001 | Logan et al. | |
| 6,222,530 B1 | 4/2001 | Sequeira | |
| 6,226,672 B1 | 5/2001 | DeMartin et al. | 709/219 |
| 6,237,786 B1 | 5/2001 | Ginter et al. | |
| 6,240,185 B1 | 5/2001 | Van Wie et al. | |
| 6,243,328 B1 | 6/2001 | Fenner et al. | 369/30 |
| 6,243,725 B1 | 6/2001 | Hempleman et al. | 707/530 |
| 6,247,061 B1 | 6/2001 | Douceur | |
| 6,248,946 B1 | 6/2001 | Dwek | 84/609 |
| 6,253,193 B1 | 6/2001 | Ginter et al. | |
| 6,262,569 B1 | 7/2001 | Carr et al. | |
| 6,263,313 B1 | 7/2001 | Milsted et al. | |
| 6,263,362 B1 | 7/2001 | Donoho et al. | 709/207 |
| 6,266,788 B1 | 7/2001 | Othmer et al. | 714/38 |
| 6,300,880 B1 | 10/2001 | Sitnik | |
| 6,314,576 B1 | 11/2001 | Asamizuya et al. | |
| 6,332,163 B1 | 12/2001 | Bowman-Amuah | |
| 6,356,936 B1 | 3/2002 | Donoho et al. | 709/206 |
| 6,363,488 B1 | 3/2002 | Ginter et al. | |
| 6,366,914 B1 | 4/2002 | Stern | 707/10 |
| 6,389,402 B1 | 5/2002 | Ginter et al. | |
| 6,421,651 B1 | 7/2002 | Tedesco et al. | 705/8 |
| 6,427,140 B1 | 7/2002 | Ginter et al. | |
| 6,430,537 B1 | 8/2002 | Tedesco et al. | 705/8 |
| 6,434,621 B1 | 8/2002 | Pezzillo et al. | 709/231 |
| 6,434,628 B1 | 8/2002 | Bowman-Amuah | 709/303 |
| 6,438,450 B1 | 8/2002 | DiLorenzo | |
| 6,438,630 B1 | 8/2002 | DeMoney | |
| 6,441,832 B1 | 8/2002 | Tao et al. | 345/723 |
| 6,446,080 B1 | 9/2002 | Van Ryzin et al. | 707/104 |
| 6,446,125 B1 | 9/2002 | Huang et al. | |
| 6,446,126 B1 | 9/2002 | Huang et al. | |
| 6,449,367 B2 | 9/2002 | Van Wie et al. | |
| 6,453,316 B1 | 9/2002 | Karibe et al. | |
| 6,477,541 B1 | 11/2002 | Korst et al. | |
| 6,477,707 B1 | 11/2002 | King et al. | |
| 6,492,469 B2 | 12/2002 | Willis et al. | |
| 6,496,744 B1 | 12/2002 | Cook | 700/95 |
| 6,502,194 B1 * | 12/2002 | Berman et al. | 726/28 |
| 6,505,160 B1 | 1/2003 | Levy et al. | 704/270 |
| 6,519,648 B1 | 2/2003 | Eyal | 709/231 |
| 6,526,411 B1 | 2/2003 | Ward | 707/102 |
| 6,529,586 B1 | 3/2003 | Elvins et al. | 379/88.13 |
| 6,536,037 B1 | 3/2003 | Guheen et al. | 717/151 |
| 6,542,445 B2 | 4/2003 | Ijichi et al. | 369/30.08 |
| 6,546,397 B1 | 4/2003 | Rempell | 707/102 |
| 6,550,057 B1 | 4/2003 | Bowman-Amuah | 717/126 |
| 6,601,041 B1 | 7/2003 | Brown et al. | |
| 6,609,097 B2 | 8/2003 | Costello et al. | |
| 6,618,424 B1 | 9/2003 | Yamada et al. | |
| 6,618,484 B1 | 9/2003 | Weber et al. | |
| 6,658,568 B1 | 12/2003 | Ginter et al. | |
| 6,668,325 B1 | 12/2003 | Collberg et al. | |
| 6,725,275 B2 | 4/2004 | Eyal | |
| 6,772,340 B1 | 8/2004 | Peinado et al. | |
| 6,772,435 B1 | 8/2004 | Thexton et al. | |
| 6,910,220 B2 | 6/2005 | Hickey et al. | |
| 6,950,623 B2 | 9/2005 | Brown et al. | |
| 7,020,710 B2 | 3/2006 | Weber et al. | |
| 7,020,893 B2 | 3/2006 | Connelly | |
| 7,024,485 B2 | 4/2006 | Dunning et al. | |
| 7,136,906 B2 | 11/2006 | Giacalone, Jr. | |
| 7,185,352 B2 | 2/2007 | Halford et al. | |
| 7,412,532 B2 | 8/2008 | Gondhalekar et al. | |
| 7,493,289 B2 | 2/2009 | Verosub et al. | |
| 2001/0003828 A1 | 6/2001 | Peterson et al. | |
| 2001/0030660 A1 * | 10/2001 | Zainoulline | 345/720 |
| 2002/0032907 A1 | 3/2002 | Daneils | |
| 2002/0059237 A1 * | 5/2002 | Kumagai et al. | 707/9 |
| 2002/0059624 A1 | 5/2002 | Machida et al. | |
| 2002/0068525 A1 | 6/2002 | Brown et al. | |
| 2002/0078056 A1 | 6/2002 | Hunt et al. | |
| 2002/0082914 A1 | 6/2002 | Beyda et al. | |
| 2002/0091761 A1 | 7/2002 | Lambert | |
| 2002/0095510 A1 | 7/2002 | Sie et al. | |
| 2002/0104099 A1 | 8/2002 | Novak | |
| 2002/0107968 A1 | 8/2002 | Horn et al. | |
| 2002/0108395 A1 | 8/2002 | Fujita et al. | |
| 2002/0152876 A1 | 10/2002 | Hughes et al. | |
| 2002/0152878 A1 | 10/2002 | Akashi | |
| 2002/0158895 A1 | 10/2002 | Murase et al. | |
| 2002/0198846 A1 | 12/2002 | Lao | |
| 2003/0014436 A1 | 1/2003 | Spencer et al. | |
| 2003/0018797 A1 | 1/2003 | Dunning et al. | |
| 2003/0023973 A1 | 1/2003 | Monson et al. | |
| 2003/0023975 A1 | 1/2003 | Schrader et al. | |
| 2003/0028659 A1 | 2/2003 | Mesarina et al. | |
| 2003/0028893 A1 | 2/2003 | H. Addington | |
| 2003/0048418 A1 | 3/2003 | Hose et al. | |
| 2003/0069768 A1 | 4/2003 | Hoffman et al. | |
| 2003/0121050 A1 | 6/2003 | Kalva et al. | |
| 2003/0126275 A1 | 7/2003 | Mungavan et al. | |
| 2003/0135605 A1 | 7/2003 | Pendakur | |
| 2003/0195974 A1 | 10/2003 | Ronning et al. | |
| 2003/0236906 A1 | 12/2003 | Klemets et al. | |
| 2004/0064507 A1 | 4/2004 | Sakata | |
| 2004/0138948 A1 | 7/2004 | Loomis | |
| 2004/0177115 A1 | 9/2004 | Hollander et al. | |
| 2004/0222047 A1 | 11/2004 | DiFranza et al. | |
| 2005/0056494 A1 | 3/2005 | Amo et al. | |

| | | | |
|---|---|---|---|
| 2005/0114757 | A1 | 5/2005 | Sahota et al. |
| 2005/0159104 | A1 | 7/2005 | Valley et al. |
| 2006/0155400 | A1 | 7/2006 | Loomis |
| 2009/0164794 | A1 | 6/2009 | Verosub et al. |
| 2009/0175591 | A1 | 7/2009 | Gondhalekar et al. |

FOREIGN PATENT DOCUMENTS

| | | |
|---|---|---|
| EP | 0 875 846 A2 | 11/1998 |
| EP | 0 986 046 A1 | 3/2000 |
| EP | 1 113 605 A2 | 7/2001 |
| EP | 1178487 A1 | 2/2002 |
| EP | 1187423 A2 | 3/2002 |
| EP | 1229476 A2 | 8/2002 |
| EP | 1244021 A1 | 9/2002 |
| EP | 1267247 A2 | 12/2002 |
| EP | 1286351 A2 | 2/2003 |
| EP | 1 187 485 B1 | 4/2003 |
| JP | 2002108395 | 4/2002 |
| JP | 2002318587 | 10/2002 |
| JP | 2003068968 A | 3/2003 |
| JP | 2003069768 | 3/2003 |
| TW | 497055 | 8/2002 |
| WO | WO 01/10496 A2 | 2/2001 |
| WO | WO 02/063414 | 8/2002 |

OTHER PUBLICATIONS

Platt, J.C. et al.; *Learning a Gaussian Process Prior for Automatically Generating Music Playlists*; Microsoft Corporation.

Brumitt, B. et al.; *EasyLiving: Technologies for Intelligent Environments*; Microsoft Research.

Matic, G.; *Intelligent Multicast Internet Radio*; University of Dublin; Sep. 16, 2002.

Crossen, A. et al.; *Flytrap: Intelligent Group Music Recommendation*; IUI 02. 2002 International Conference on Intelligent User Interfaces; Jan. 2002.

Drews, C. et. al.; *Virtual jukebox: reviving a classic*; Proceedings of the 35th Annual Hawaii International Conference on System Sciences, p. 887-93, Jan. 2002.

Mccandless, M.; *The MP3 revolution*;IEEE Intelligent Systems vol. 14, No. 3, p. 8-9; May-Jun. 1999.

Grandi, F. et al; *The Valid Web: an XML/SSL Infrastructure for Temporal Management of Web Documents*; ADVIS 2000; Oct. 25-27, 2000; Lecture Notes in Computer Science; vol. 1909, p. 294-303Izmir, Turkey; Pub: Springer-Verlag;2000; xvi+460pp.; Germany.

Bachiochi, D., et al; *Usability Studies and Deisgning Navigatinal Aids for the World Wide Web*; 6th Intnl World Wide Web Conf.; Apr. 7-11, 1997; Santa Clara, CA; USA; Pub: Elsevier; Comput. Netw. ISDN Syst.; vol. 29, No. 8-13, p. 1489-96, Sep. 1997; Netherlands.

Conference Paper: IP Data Over Satelite to Cable Headends and a New Operation Model with Digital Store and Forward Multi-Media System; NCTA; 2000 Technical Papers.

"Packet Synchronization Recovery Circuit," vol. 16, No. 294, p. 120; Mar. 12, 1992.

Helix Universal Gateway Configuration Guide, RealNetworks Technical Blueprint Series; Jul. 21, 2002.

Wonjon, L. et al. ; "QoS-adaptive bandwidth scheduling in continuous media streaming" Dept of Computer Sci and Engr, Korea University, Seoul, South Korea; Information and Software Technology, vol. 44, No. 9, p. 551-53, Seoul, Korea; Jun. 15, 2002.

Xu.C., Feng, D., "Web based Protection and Secure Distribution for Digital Music," Aug. 13-16, 2001, Proceedings for International Conference on Internet and Multimedia Systems and Applications, Hawaii, USA, pp. 102-107.

Apple's iTunes Music Store—http://www.apple.com/music/store.

Conference Paper: IP Data Over Satelite to Cable Headends and a New Operation Model with Digital Store and Forward Multi-Media System.

Poellabauer, C. Schwan K., West, R., Coordinated CPU and Event Scheduling for Distributed Multimedia Applciations:, Oct. 1, 2001, ACM Multimedia; Ottawa, Canada.

"Packet Synchonization Recovery Circuit," vol. 16, No. 294, p. 120.

Hodson, O., et al., "Skew Detection and Compensation for Internet Audio Application," 2000, IEEE international Conference on Multimedia Proceedings, USA, Part vol. 3, pp. 1687-90.

Aurrecoechea, C., et al., "A Survey of QoS Architectures," Columbia University, New York.

Cen,S., Pu, R., Staehi, R.,Walpole, J., "A Distributed Real-Time. MPEG Video Audio Player", Dept of Computer Science and Engineering, Oregon Graduate Institute of Science and Technology.

Manouselis,N.,Karampiperis, P., Vardiambasis,I.O., Maras, A., "Digital Audio Broadcasting Systems under a QoS Perspective", Telecommunications Laboratory, Dept. of Electronics & Computer Engineering, Technical University of Crete, Greece.

Helix Universal Gateway Configuration Guide, RealNetworks Technical Blueprint Series.

Sion, R., Elmagarmid, A., Prabhakar, S., Rezgui, A., Challenges in designing a QoS aware Media Repository (working draft) Computer Science, Purdue University, IN.

Chen, Z., Tan,S.-M., Campbell, R., Li, Y., "Real Time Video and Audio in the World Wide Web". Dept. of Computer Science, Univ. of Illinios, Champagne—Urbana.

Content Networking with the Helix Platform, RealNetworks White Paper Series, Jul. 2002.

Hess, C., Media Streaming Protocol: An Adaptive Protocol for the Delivery of Audio and Video Over the Internet, 1998, Univ. of Illinois, Champagne-Urbana.

Koster, R., "Design of a Multimedia Player with Advanced QoS Control", Jan. 1997, Oregon Graduate Institute of Science and Technology.

Narasimha, R. et al. "I/O Issues in a Multimedia System"; Computer, vol. 27, No. 3, p. 69-74, Mar. 1994, USA.

Ramakrishnan, K.K. et al; "Operating system Support for a video-on-demand file service"; Multimedia Systems; vol. 3, No. 2, p. 53-65, 1995 West Germany.

Nwosu, K.C. et al "Data Allocation and Spatio-Temporal Implications for Video-on-Demand Systems"; Proceedings of 1995 14th Annual Phoenix Conference on Computers and Communications; (Cat. No. 95CH35751), p. 629-35; IEEE: 1995 USA.

Eun, S,: et al. "Nonpreemptive scheduling algorithims for multimedia communication in local area networks"; Proceedings 1995 Intl Conf on Network Protocols (Cat. No. 95TB8122) p. 356-IEEE Comput. Soc. Press; 1995 Los Alamitos, CA USA 1996.

Nakajima, T.; "A Dynamic QoS control based on Optimistic processor reservation"; Proceedings of the Intn'l onf. on Multimedia Computing and Systems (Cat. No. 96TB100057), p. 95-103, IEEE Comp. Soc. 1996, Los Alamitos, CA.

Orji, C.U. et al; "Spatio-temporal effects of mutimedia objects storage delivery on video-on-demand systems"; Mutlimedia Sytems; vol. 5, No. 1, p. 39-52, Springer-Verlag; Jan. 1997, Germany.

Kenchammana-Hosekote, D.R., et al.; "I/O scheduling for digital continuous media"; Mutlimedia Systems, vol. 5, No. 4, p. 213-37, Springer-Verlag, Jul. 1997 Germany.

Matsui, Y et al.; "VoR: a network system framework for Vbrt over reserved bandwidth"; Interactive Distributed Mutlimedia Systems and Telecommunications Services, 4th Int'l Workshop, IDMS '97 Proceedings; p. 189-98, Springer-Verlag; 1997, Berlin, Germany.

Luling, R. et al.; "Communication Scheduling in a Distributed memory parallel interactive continuous media server system"; Proceeedings of 1998 ICPP Workshop on Architectural systems and OS Support for Multimedia Applications Flexible Communications Systems, Wireless Networks and Mobile Computing; (Cat. No. 98EX206) p. 56-65; IEEE Comput. Soc, 1998 Los Alamitos, CA USA.

Seongbae, E., et al; A real-time scheduling algorithim for multimedia communication in samll dedicated multimedia systems; Kiss(A) (Computer Systems and Theory) vol. 25, No. 5, p. 492-502; Korea Inf. Sci. Soc; May 1998, South Korea, 1999.

Garofalakis, M.N., et al. "Resource scheduling in enhanced pay-per-view continuous media databases"; Proceedings of 23rd Int'l Conf. on Very Large Databases; p. 516-25; Morgan, Kaufman Publishers, 1997, San Francisco, CA USA 1999.

Mostefaoui, A.; "Exploiting data structures in a high performance video server for TV archives"; Proceedings of the Int'l Symposium on Digital Media information Base, p. 516-25, World Scientific, 1998 Singapore.

Garofalakis, M.N., On periodic resource scheduling for continuous media databases: VLDB Journal, vol. 7, No. 4, p. 206-25; 1998 Springer Verlag, germany 1999.

Hwee-Hwa, P., et al, "Resource Scheduling in a High Performance Multimedia Server," Mar.-Apr. 1999, IEEE, USA.

Young-Uhg, L. et al,"Performance analysis and evaluation of allocating subbanded video dta block on MZR disk arrays"; Proceedings of teh High Performance Computing (HPC'98) p. 335-40, Soc for Comp Simulation Intn'l 1998, San Diego, CA, USA.

Feng, C. et al.; "An architecture of distributed media servers for supporting guaranteed QoS and media indexing", IEEE Intn'l Conf on Multimedia Computing and Systems, Part vol. 2 IEEE Comp. Soc. 2 vol. 1999 Los Alamitos, CA 1999.

To, T.-P.J. et al "Dynamic optimization of readsize in hypermedia servers"; IEEE Intn'l Conf on Mutlimedia Computing and Systems; Part vol. 2, p. 486-91, Pub. IEEE Comput. Soc, 2 vol. 1999 Los Alamitos, CA USA.

Lee, W. et al., "QoS-adaptive bandwidth scheduling in continuous media streaming"; Information and Software Technology; v.44n, Jun. 2002, p. 551-563.

Waddington, D.G., "Resource partitioning in general purpose operating systems; experimental results in Windows NT"; Operating Systems Review, vol. 33, No. 4, p. 52-74; ACM, Oct. 1999, USA.

Ditze, M. et al. "A method for real-time scheduling and admission control of MPE 2 streams; Part 2000; 7th Australian Conference on Parallel and Real-Time Systems", Nov. 2000, Sydney, NSW, Australia, Pub: Springer-Verlag, Hong Kong, China 2001.

Garofalakis, M., et al, "Competitive Online scheduling of continuous media streams", Journal of Computer and Systems Sciences; vol. 64, No. 2 p. 219-48, Academic Press, Mar. 2002 USA.

Wonjon, L. et al. ; "QoS-adaptive bandwidth scheduling in continuos media streaming" Dept of Computer Sci and Engr, Korea University, Seoul, South Korea; Information and Software Technology, vol. 44, No. 9, p. 551-53, Seoul, Korea.

Mourlas, C.; "Deterministic scheduling of CBR and VBR media flows on parallel media servers", Euro-Par 2002 Parallel Processing 8th Intn'l Euro-Par Conference Proceedings; vol. 2400, p. 807-15, Aug. 2002, Paderborn, Germany 2003.

Buford, J.F.; "Storage server requirements for delivery of hypermedia documents", Proceedings of the SPIE—The International Society for Optical Engineering Conference, Int. Soc. Opt. Eng. vol. 2417, p. 346-55, 1995.

Aurrecoechea et al. "A Survey of QoS Architectures," Center for Telecommunication Research, Columbia Universit , New York, May 1998, vol. 6, No. 3, 24 pgs.

Cen,S., Pu, R., Staehi, R.,Walpole, J., "A Distributed Real-Time Mpeg Video Audio Player," Dept of Computer Science and Engineering, Oregon Graduate Institute of Science and Technology, lecture Notes in Computer Science; 1995, vol. 1018, pp. 142-153.

Manouselis et al., "Digital Audio Broadcasting Systems under a QoS Perspective," Proceedings of the 4th WSEAS International Conference on Telecommunications and Informatics table of contents, 2005, Article No. 51, 11 pgs.

Sion, R., Elmagarmid, A., Prabhakar, S., Rezgui, A., "Challenges in designing a QoS aware Media Repository," working draft, Computer Science, Purdue University, in, 2000, 8 pgs.

Microsoft Computer Dictionary definition of Function Call, 2002.

Monien et al., "Online scheduling of continuous media streams," Foundations of Computer Science Potential-Theory-Cognition Lecture Notes in Computer Science, 1997, vol. 1337, pp. 313-320.

Non-Final Office Action for U.S. Appl. No. 10/734,783; Date of Mailing: Aug. 14, 2007; 18 pgs.

Notice of Allowance and Interview Summary for U.S. Appl. No. 10/734,783; Date of Mailing: Jan. 16, 2008; 16 pgs.

Notice of Allowability for U.S. Appl. No. 10/734,783; Date of Mailing: Apr. 21, 2008; 3 pgs.

Notice of Allowance for U.S. Appl. No. 10/734,783; Date of Mailing: Apr. 30, 2008; 3 pgs.

* cited by examiner

FIG. 4

APPARATUS AND METHOD FOR SKIPPING SONGS WITHOUT DELAY

CROSS-REFERENCE TO RELATED APPLICATIONS

This application claims priority to the U.S. provisional patent application Ser. No. 60/433,734, filed on Dec. 13, 2002, which application is incorporated herein in its entirety by this reference thereto.

BACKGROUND OF THE INVENTION

1. Technical Field

This invention generally relates to Internet based personalized radio/music technology. More particularly, the invention relates to an apparatus and method allowing a user to skip one or more songs in a pre-selected play list without having an unintended delay between skips.

2. Description of the Related Art

Internet based personalized radio services, such as Radio@AOL and iSelect, provide users a high flexibility to choose programs and make their own play list using a graphical user interface which is part of the client application of the service. The client application sends a user's request to the server and the server responds to the user's request by returning the requested in compressed data. The client application along with the user's browser executes a decompression algorithm to decompress the compressed data in real time and sequentially plays the data as it is transferred from the server to the user's computer over the Internet. Using streaming technologies, the user's computer does not need to download the entire file first and then play it. Rather, after downloading a minimal section of data into a buffer, the user's computer reads from the buffer and plays the song or music represented by the data. The data already read by the computer is deleted from the buffer so as to ease the RAM requirements and maintain a balance between the write-in and the read-out data flows.

Figure 2A:
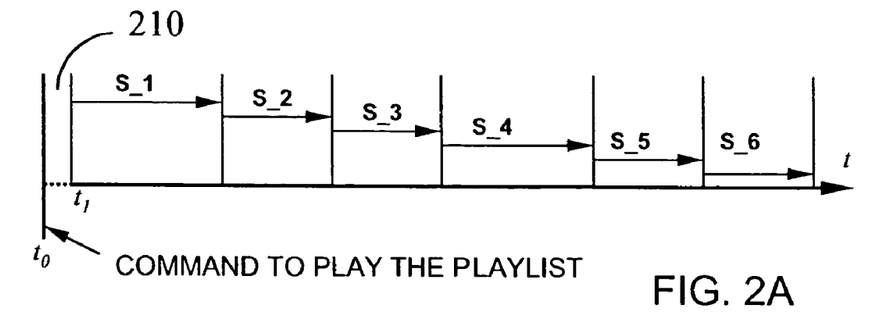
FIG. 2A is a schematic diagram illustrating a natural flow of the user's play list, which is a sequence of songs pre-selected by the user via the graphical user interface supported by the client application in FIG. 1A and FIG. 1B.
Figure 2B:
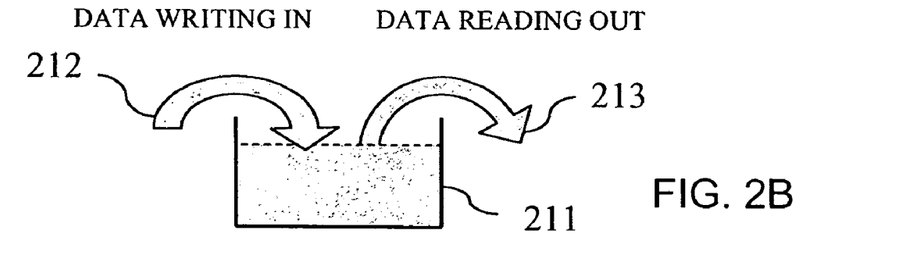
FIG. 2B is a schematic diagram illustrating how a buffer works.
Figure 2C:
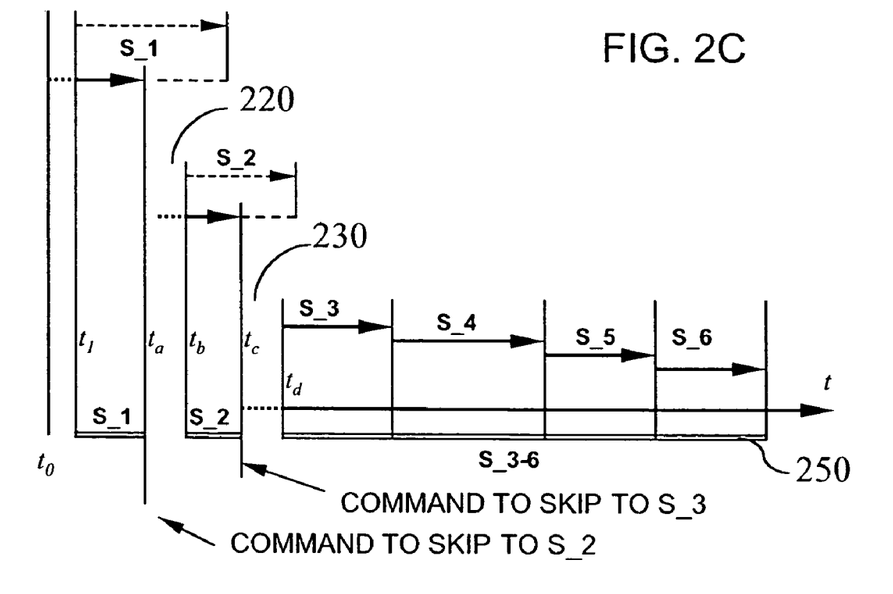
FIG. 2C is a schematic diagram illustrating how the natural flow of the user's play list is interrupted by skips.

When the user's computer plays a play list or a preset, which is either created by the user or by the service provider, the server sends and the user's computer receives the data over the Internet in a programmed sequence so that there is no unintended delay between any two programs in the list. If the user does not interrupt, the computer plays the songs in the list one by one in an organized consecutive manner. However, when the user switches from one list or preset to another, the users actually interrupts the natural flow of the play list or the preset. In these circumstances, because the computer has to request that the server start to send the data for the target list or preset, several seconds of loading time is needed. Likewise, when the user wants to be actively be involved in the sequence of the play list or preset by skipping one or more songs, as it is illustrated in FIG. 2C, the natural flow of the pre-determined play list or preset is interrupted by the loading transition. This type of unintended delay between skips has been a major factor affecting users experience using personalized radio service.

Therefore, there is a need in the art to provide a solution to overcome the unintended delay or pause problem caused by a user's skipping from one song to the other while a pre-determined list of selections is playing in a programmed sequence.

SUMMARY OF THE INVENTION

In an Internet based personalized radio, where a user has a pre-selected list of songs to be played in a particular order, the invention provides an apparatus and method allowing the user to skip one or more songs without having a delay between skips. This is accomplished by downloading and pre-caching, i.e. pre-buffering the first small portion of each of the next several songs on the play list so that, should the user choose to skip to any of the next several songs, the pre-buffered small portion of the target song is already available to be played and therefore there is no unintended delay between two songs. The apparatus starts to play the pre-buffered small portion of the target song and starts to download the rest of the target song at the same time. Because the system is so configured that the time for playing the pre-buffered small portion is longer than the initial buffering time for the rest of the target song, the entire target song is played smoothly. In other words, there is no unintended delay between the first small portion and the rest portion either.

In the preferred embodiment of the invention, the first small portion is approximately the first ten seconds of the song. This solution is advantageous because ten seconds of pre-buffering complies with various royalty requirements such that if the user skips before the ten seconds pre-buffered portion is played, a royalty is not accessed for listening to the song. In addition, avoiding of downloading the entire next song conserves bandwidth and memory.

DETAILED DESCRIPTION OF THE INVENTION

Figure 1A:
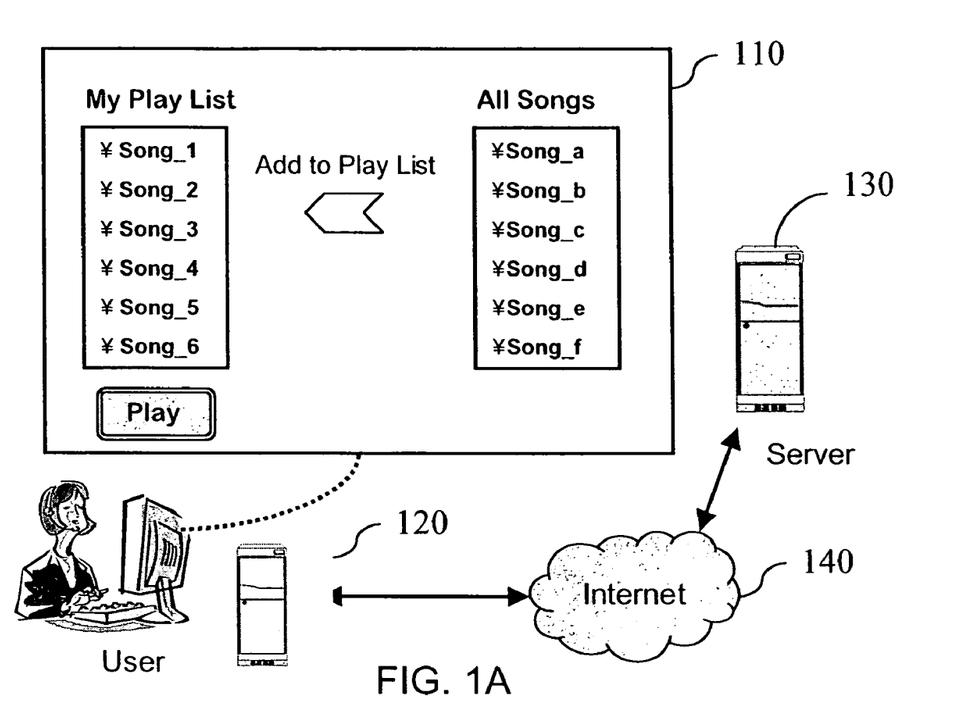
FIG. 1A is a schematic diagram illustrating a system in which a user uses a graphical interface running on a local computer to access a radio service provided by a remote server over the Internet.
Figure 1B:
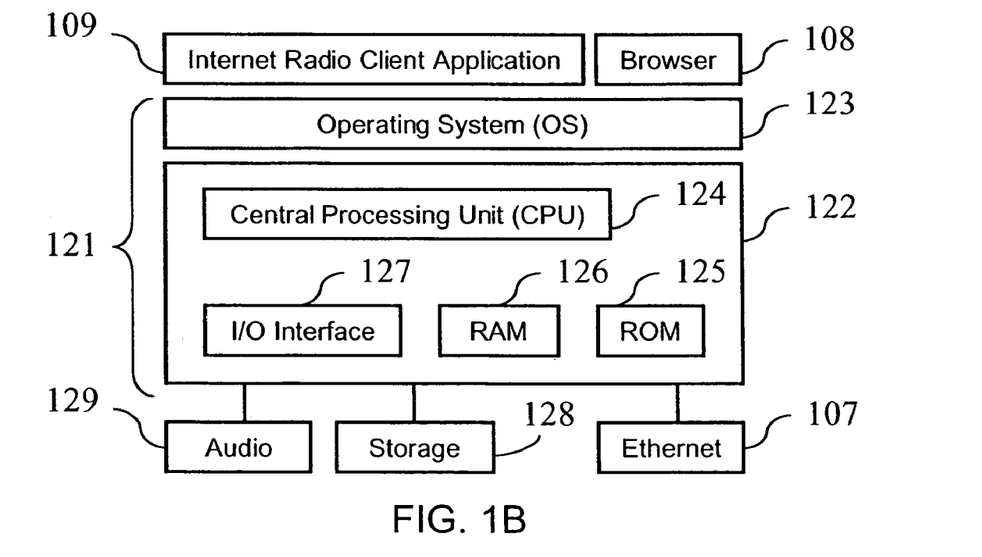
FIG. 1B is a block diagram further illustrating the local environment in which the preferred embodiment of this invention operates.

Referring to the drawings, in particular to FIG. 1A and FIG. 1B, which, in combination, illustrates an environment where this invention embodies. FIG. 1A is a schematic diagram illustrating a system in which a user uses a graphical interface 110 running on a local computer 120 to access a radio service provided by a remote server 130 over the Internet 140. The local computer is powerful enough to execute in real time a decompression algorithm required for streaming.

FIG. 1B is a block diagram further illustrating the local environment in which the preferred embodiment of this invention operates. The local environment includes a computer platform 121 which includes a hardware unit 122 and an operating system 123. The hardware unit 122 includes at least one central processing unit (CPU) 124, a read only random access memory (usually called ROM) 125 for storing application programs, a write/read random access memory (usually called RAM) 126 available for the application programs' operations, and an input/output (IO) interface 127. Various peripheral components are connected to the computer platform 121, such as a data storage device 128, an audio system 129 such as an MP3 player, and an Internet connection interface such as an Ethernet 107. The user uses a web browser 108 to go online. An Internet radio client application 109, which supports the graphical user interface 110, runs on the computer platform 121. The client application 109, along with an advanced clip loader which is also called piledriver, can be deployed as a plug-in to the web browser 108 such as the Netscape Navigator. Those skilled in the art will readily understand that the invention may be implemented within other systems without fundamental changes.

Using clip based data streaming technologies, the user's local computer 120 can play audio or video program in real time as it is being downloaded over the Internet as opposed to pre-storing the entire program in a local file. The Internet radio client application 109 coupled to the web browser 108 decompresses and plays the data as it is being transferred to the local computer 120 over the Internet. The piledriver is responsible for delivering, for example, an Ultravox formatted stream to the client application in a seamless fashion, in addition to raw data. Streaming audio or video avoids the unintended delay entailed in downloading an entire file and then playing it with a helper application. For the clip based streaming to work, the client side receiving the data must be able to collect the data and send it as a steady stream to the program that is processing the data and converting it to sound or pictures. This means that if the data does not come quickly enough, the presentation of the data will not be smooth. If the streaming client receives the data more quickly than required, it needs to save the excess data in a buffer, which is an area of memory in the write/read random access memory (RAM). Even when the write speed and the read speed are exactly same, to maintain a smooth data flow, a minimum amount of data in the buffer is necessary.

From a high level view, the piledriver receives a play list from an audio or video client application. It analyzes the play list and locally caches the first small portion (e.g. first ten seconds) for clip in the play list. The client can then connect to the piledriver data pump and retrieve the data stream using the HTTP or Ultravox 2.0 Protocols. The major functions of the piledriver include: (1) managing the retrieval and caching the pre-buffer for items in the play list; (2) managing the content in memory; (3) providing content to audio or video clients using raw data or the Ultravox 2.0 protocol from either a local cache or directly from a content-store; and (4) providing a stream of data to the audio or video client mimicking local disk functionality.

The piledriver takes a play list and attempts to present an uninterrupted stream of audio or video output to the client application. One of the primary features of the client application is that it allows the listener to abort a current song being played and request the start of the next clip in the play list.

In order to minimize the amount of time taken for skipping, the piledriver performs two operations in parallel. First, it requests the first URL in the play list from the UltraMODS/HTTP server. Once the pre-buffer data arrives, it waits for the audio or video client to start playing the clip, and also continues downloading the pre-buffer segments for each of the next clips in the play list, in order.

There are two reasons to request the pre-buffers in advance. First, it reduces the delay involved in requesting the clip and then obtaining the pre-buffer before being able to play the audio or video. Second, it causes UltraMODS/HTTP to obtain the media file from the content-store if it does not have it already, hopefully in advance of the new request by the client.

The functional components for the piledriver include a pre-buffer cache engine and a clip/stream retrial application program interface (API). The pre-buffer cache engine is responsible for caching clips in advance of playtime. The clip/retrial API contacts the Apache/UltraMODS/Cache engine for content. For illustration purpose, given below is an exemplary list of API calls and their functions:

pdInit
    PILEDRIVERTYPE *pdInit(int cacheahead, int initringsize)
    This is the first function called to initialize the piledriver. The number of clips to cache in advance and the size of the pre-buffer cache can be specified.

pdAddItem
    PDFILEHANDLE pdAddItem(PILEDRIVERTYPE *piledriver, char *url, unsigned long start, unsigned long end)
    Call to add a URL to the cache-ahead playlist. It can be configured to add the entire play list, or just enough to keep the cache-ahead system busy.

pdOpen
    PDFILEHANDLE pdOpen (PILEDRIVERTYPE*piledriver, PDFILEHANDLE handle)
    Call to open PFFILEHANDLE after the item has been added to the cache engine with pdAddItem. If the file is cached it returns the size of the pre-buffer, 0 if no pre-buffer, or −1 if there was an error related to the files availability.

pdReadRaw
    int pdReadRaw(PILEDRIVERTYPE *piledriver, char *buffer, unsigned int toread, PDFILEHANDLE handle)
    Call to an opened PFFILEHANDLE to retrieve data. The size of the data is returned, 0 if none, −1 if EOF (End of File) has been reached or the connection was broken.

pdReadCooked
    int pdReadCooked(PILEDRIVERTYPE *piledriver, char *buffer, int toread, unsigned short *msgtype, PDFILEHANDLE handle)
    Call to an opened PFFILEHANDLE to retrieve Ultravox messages. The size of the data is returned, and msgtype contains the clad and type of the Ultravox message. 0 is returned if no message is available, and −1 if EOF has been reached or the connection was broken.

pdClose
    int pdClose(PILEDRIVERTYPE *piledriver, PDFILEHANDLE handle)
    Call to close and remove the cache-ahead engine a PFFILEHANDLE. Always call this function even if the file failed to open.

pdDeInit
    int pdDeInit(PILEDRIVERTYPE *piledriver)
    Call to stop all cache-ahead transactions, close and remove all open PFFILEHANDLEs and free all used memory.

Error Notification
    Call to make error notification. In the event of an error in any of the API functions, PILEDRIVERTYPE->error and PILEDRIVERTYPE->error-buffer contain the error code and the error string associated with the current error condition. Error codes are located in PDRIVER.H FIG. 2A is a schematic diagram illustrating a natural flow of the user's play list, which is a sequence of songs preselected by the user via the graphical user interface 110 supported by the client application 109 in FIG. 1A and FIG. 1B. Upon the user's command to play his play list, the client application 109 first checks whether there is a file characterized as the first song (S_1) of the play list is available in the buffer. If not, then start downloading the data from the server 130 over the Internet. After an initial buffering time 210, the sequence of songs is played in a continuous manner. FIG. 2B is a schematic diagram illustrating a buffer 211 which is an area of memory for temporarily storing the data downloaded from the server 130 over the Internet. The buffer 211 is used to decouple processes so that the reader 213 and writer 212 may operate at different speeds or on different sized blocks of data. For smooth playing a song or a sequence of songs, the initial buffering time 210 is necessary.

However, when the user chooses to skip to a next song before the current song ends, the natural flow is interrupted because it takes time to send the skip command to the server which starts to transmit the data for the next song, and thus a new period of buffering time is required before the next song starts to play. For example, as illustrated in FIG. 2C, after the initial buffering time 210, the first song S_1 starts playing at the time $t_1$ Before the first song S_1 ends, the user decides to skip to the second S_2 at the time $t_a$. When the application receives the command to skip to the second song S_2, the reader 213 stops reading and the writer 212 stops writing the rest data for S_1, and at the same time the application notifies the server to stop transmission of the data for S_1. Then, the application checks whether there is a file characterized as S_2 in the buffer 211. Because S_2 is not downloaded yet, the application sends the server a request to transmit the second song S_2. Thus, a buffering time 220 (from $t_a$ to $t_b$) is needed before S-2 starts. After the buffering time 220 (from $t_a$ to $t_b$), the reader 213 starts to read S_2 at the time $t_b$. Similarly, when the user decides to skip to the third song S_3 before the S_2 ends, a buffering time 230 (from $t_c$ to $t_d$) is needed before S-3 starts at time $t_d$. Because each buffering time is about several seconds, the music flow 250 is interrupted and the user experience is affected.

Figure 3A:
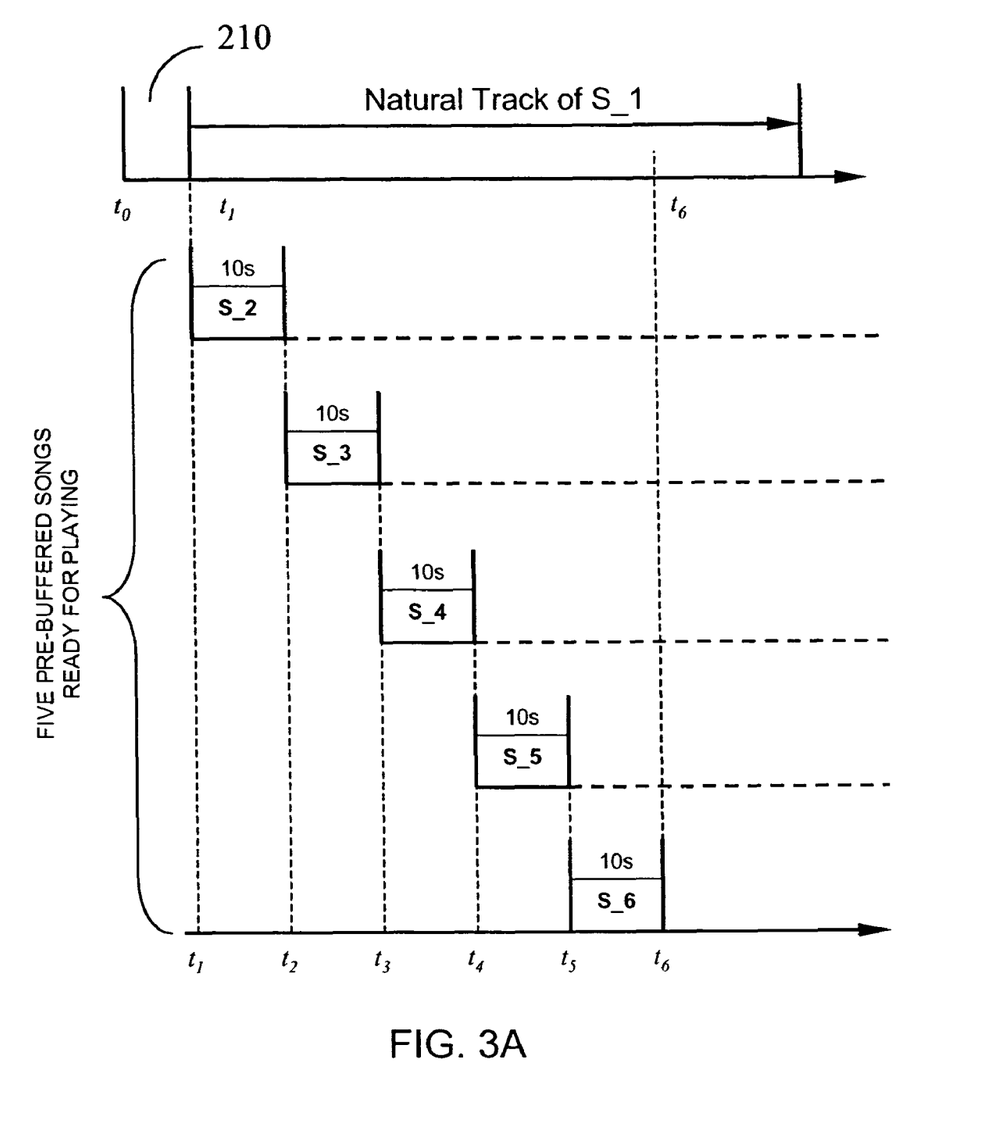
FIG. 3A is a schematic diagram illustrating a pre-buffering solution according to the preferred embodiment of this invention.
Figure 3B:
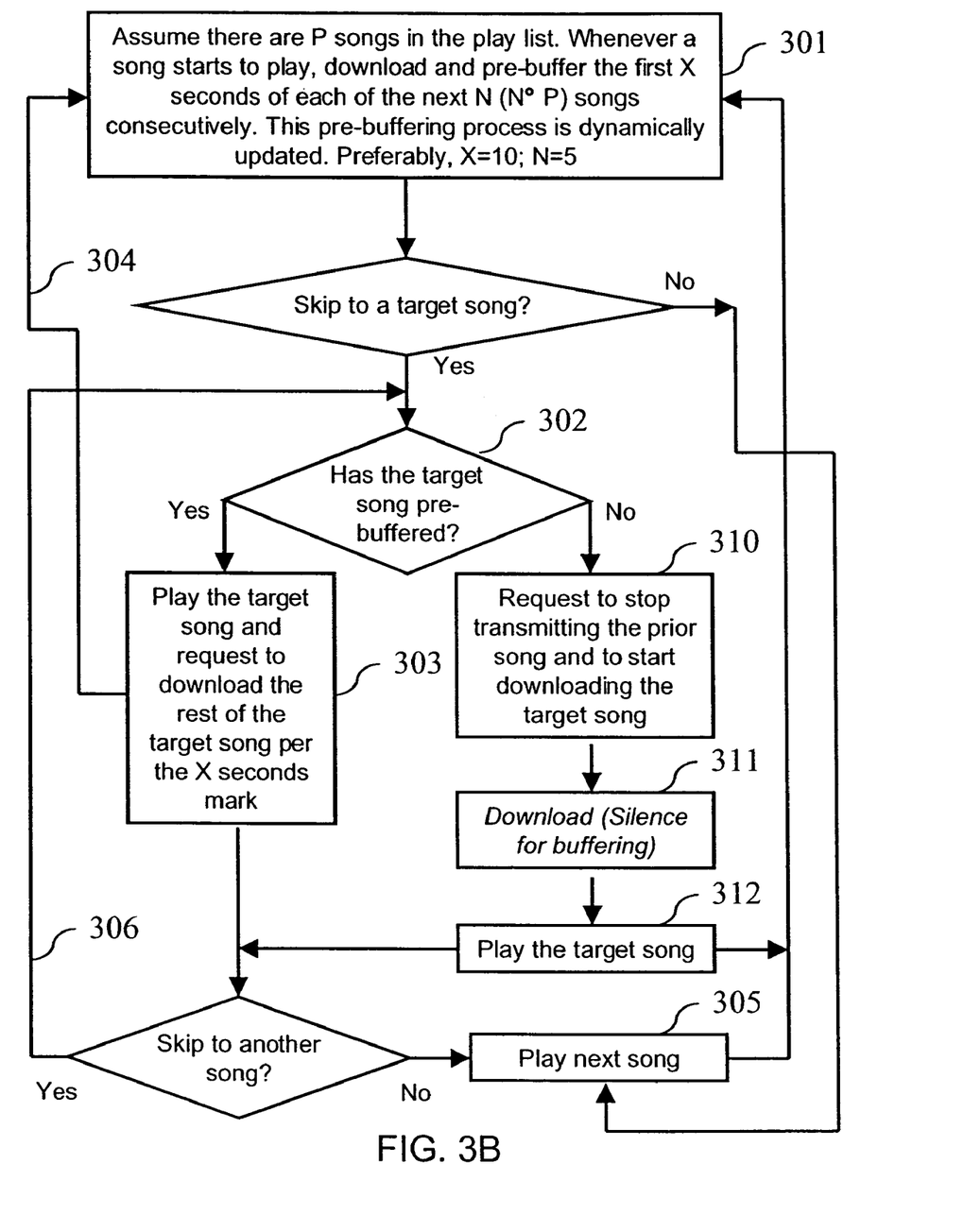
FIG. 3B is a flow chart illustrating a process according to the pre-buffering solution according to FIG. 3A.

FIG. 3A and FIG. 3B are schematic flow diagrams illustrating a solution to overcome the problems as illustrated in FIG. 2C. The solution includes the following steps to be executed by the computer:

Step 301: Start downloading the second song S_2 immediately after the initial buffering time 210 is over at the time $t_1$. This step is called pre-buffering or pre-caching. The application is configured to download only the first few seconds of S_2. In the preferred embodiment, the application is configured to download the first ten seconds. After download the first ten seconds of the second song, start downloading the first ten seconds of the third song. The similar pre-buffering step goes so on and so forth. In the preferred embodiment, the application is configured to download and pre-buffer the first ten seconds of five songs subsequent to the current song which is being played. The total time required for pre-buffering five songs is about one minute. Usually a user would be able to decide whether or not to continue the song after listening to it for one minute. Therefore, although the application can be otherwise configured, pre-buffering five songs would be good enough for most of circumstances.

Step 302: Assuming the user decides to skip to a target song (for example S_5), the application first check whether there is a file characterized as the target song.

Step 303: If S_5 is identified in the buffer and because the first ten seconds of S_5 is already there, the system can start to read S_5 immediately. This means that there is no unintended delay between S_1 and S_5 unless the networking condition is abnormally bad or the user has exhausted the local cache. At the same time, the application asks the server to transmit the rest of S_5 to the buffer. Because the buffering time for the rest of S_5 is less than ten seconds, by the time the reader finishes reading the pre-buffered ten seconds of S_5, a sufficient part of the rest of S_5 is already there and is ready to be read. Therefore, there is no interruption between the first ten seconds of S_5 and the rest of S_5. In this way, the user experience is enhanced and waiting time is minimized.

Step 304: While the song (S_5) is being displayed, update Step 301 to keep five songs subsequent to the current one being pre-buffered.

Step 305: Play next song after S_5 is over.

Step 306: Repeat Step 302 if the user wants to skip while S_5 is being played.

Steps 301-306 represents the first loop in which the user's play list is played without interruption even he sometimes decides to skip one or more songs.

This invention also helps to bring the song playing back into the first loop when an interruption occurs.

Step 310: If the check result in Step 302 is no (i.e. the target song S_5 is not identified in the buffer), the system requests that the server stop transmitting the prior song (S_1 in the example) and start transmitting the target song.

Step 311: Start to download the target song. Because the target song is not pre-buffered, an initial buffering time is required before the target song can be played. During initial buffering time, typically 5-6 seconds, the system is silent.

Step 312: Start to play the target song. This step leads to step 305 or step 306, and step 301. Because the system always attempts to have five next songs pre-buffered, if the target song is one of the pre-buffered, the natural flow of the play list will not be interrupted by skipping.

When the user skips to the target song, the pre-buffered songs which are prior to the target in the play list (e.g. S_2-S_4 if the user skipped from S_1 to S_5) will be deleted from the memory just as they had already been played.

If the application is configured to keep the skipped pre-buffered data for a short period of time, for example for 10 seconds, the user could, though not very much meaningful for many people, come back to any of the songs before it is deleted from the buffer.

Figure 3C:
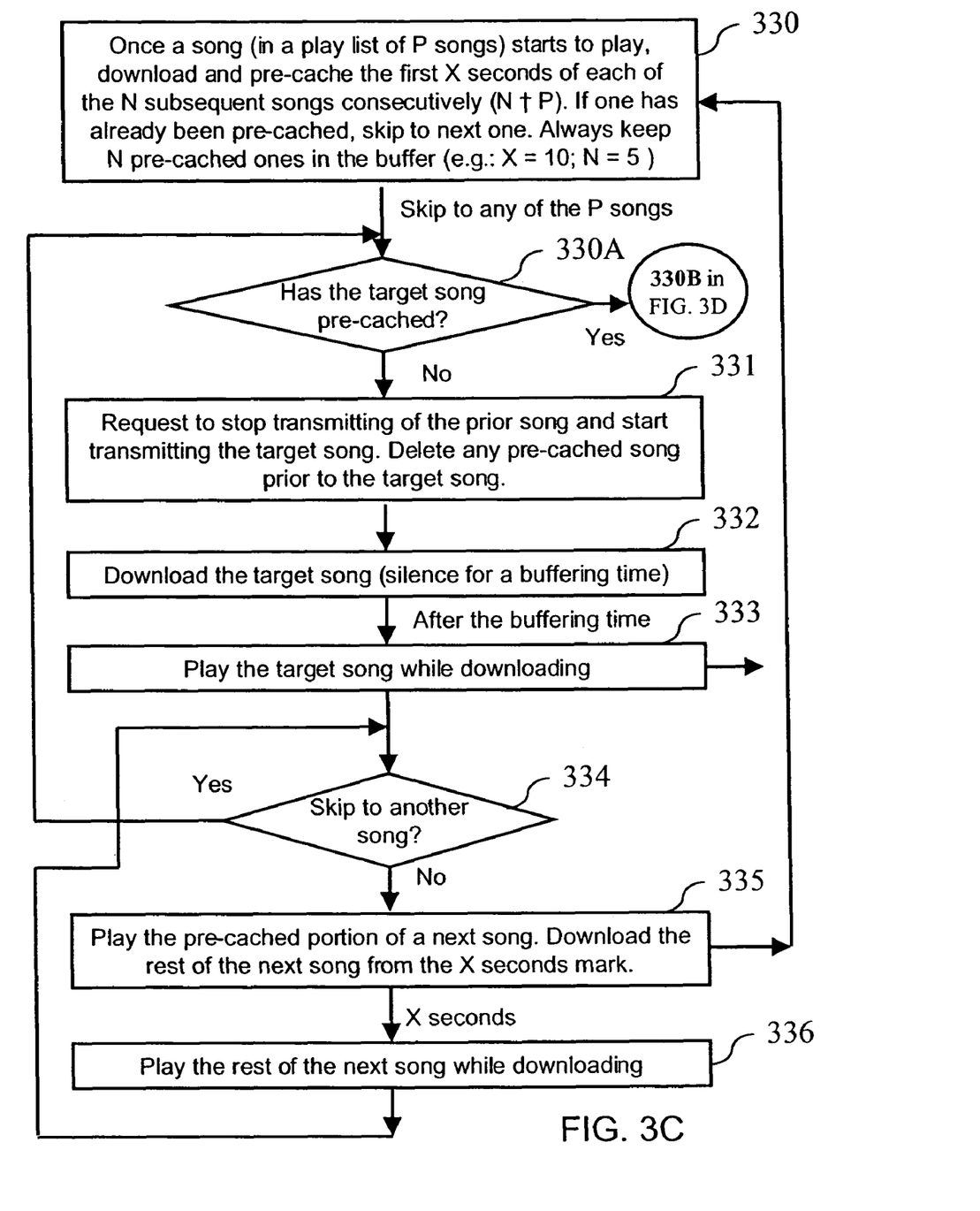
FIG. 3C is a flow chart further illustrating a major loop of FIG. 3B.
Figure 3D:
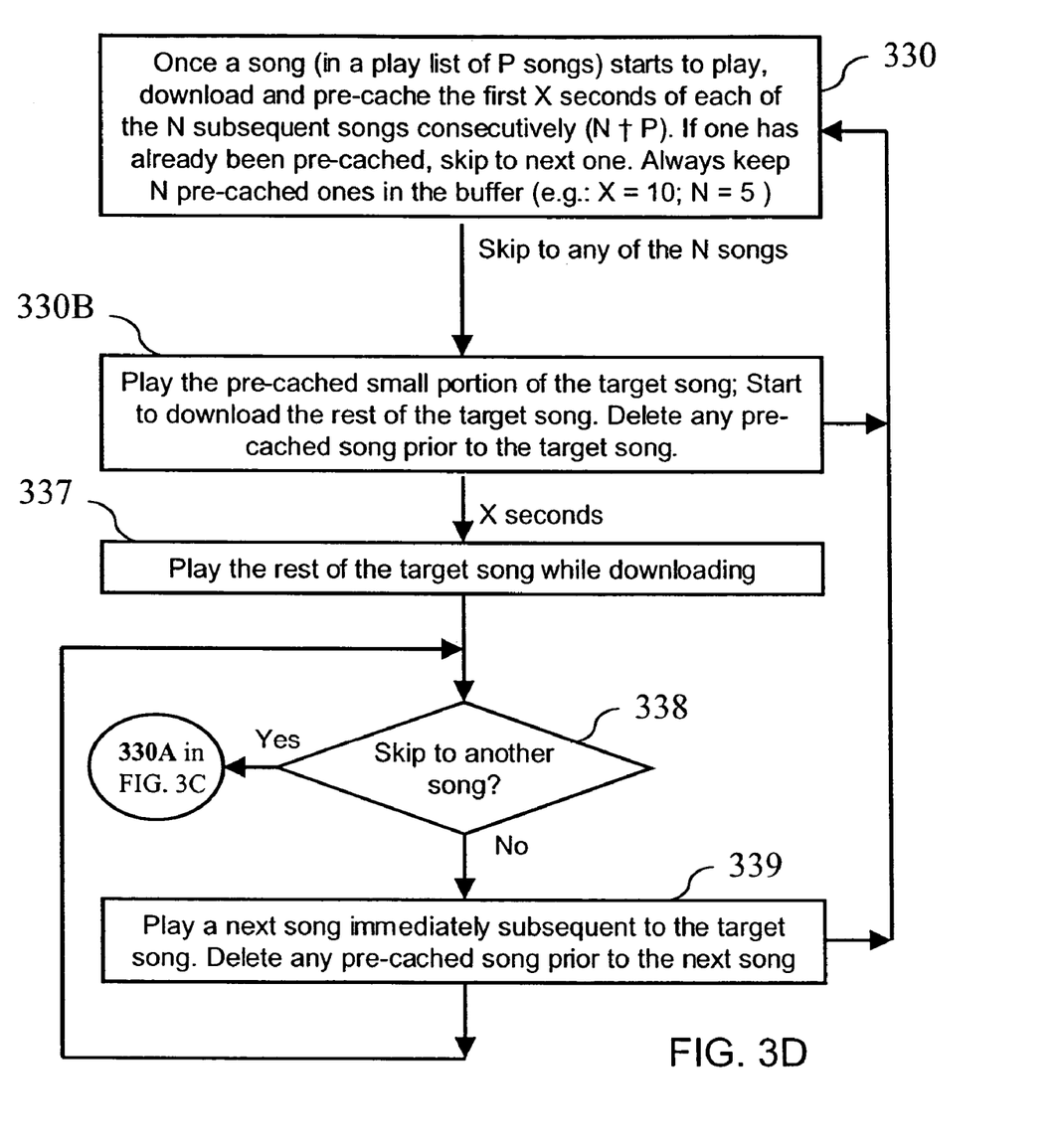
FIG. 3D is a flow chart further illustrating another major loop of FIG. 3B.

FIG. 3C and FIG. 3D are flow charts further illustrating the various loops according to FIG. 3B.

Referring to FIG. 3C, step 330 actually includes the following two sub-steps:

- as soon as a song starts to play, download, consecutively, a first small portion (e.g. ten seconds) of each of a number of songs which are, in the pre-determined sequence (i.e. play list), subsequent to the song which is currently playing; and
- pre-cache the downloaded small portions in a buffer which is an area of the user's computer memory.

In step 330A, assuming the user skips to a song (called target song) in the play list before the song in playing is over, the computer checks whether the target song belongs to one of these pre-cached in step 330 by checking whether a file characterized as the target song exists in the buffer. If yes, go on to step 330B in FIG. 3D.

Referring to FIG. 3D, step 330B includes the following sub-steps:

play the first small portion of the target song;

start to download the rest of the target song (by identifying a ten seconds mark, for example); and delete any pre-cached song which is prior to the target song in the pre-determined sequence.

Note that as soon as the pre-cached portion of the target song starts playing, step 330 needs to be updated. In particular, if one or more songs subsequent to the target song are already pre-cached, skip them and download the subsequent ones, executively, to make up the pre-designated number (five, for example).

In step 337, when the playing of the pre-cached portion ends, immediately play the rest of the target song which is being downloaded from the server over the Internet.

In steps 338-339, if the user does not want to skip to another song while the target song is playing, then play the next song in the sequence, and at the same time, delete any pre-cached song which is prior to this song. As soon as this song starts playing, step 330 needs to be updated. Because all pre-cached files, which are prior to this song in the sequence, have been deleted from the buffer, the user's computer must send request to the server to transmit the first small portion (e.g. ten seconds) of a designated number of songs, one by one. Then, the user's computer downloads and pre-caches these files in the buffer.

If the user wants to skip to another song before the playing of the target song in steps 330B-337, the process continues on step 330A in FIG. 3C which illustrates another loop.

Now referring to FIG. 3C, in step 300A, the user's computer checks whether the new target song is already pre-cached by checking whether a file characterized as the new target song exists in the buffer. If not, go to step 331 which includes two sub-steps:

send request to the server to stop transmitting the playing song and to start transmitting the new target song; and at the same time, delete the pre-cached portion for any song which is prior to the new target song in the designated sequence of songs.

Then, start to download the new target song in step 332. Because the new target song is not pre-cached, it takes a short period of buffering time (about five seconds) before the computer can play the song. This buffering time causes the interruption of the natural flow of the user's play list. This invention helps minimize the occurrences of the interruption. If the user always skips to a pre-cached song, no interruption would occur at all unless the networking condition is abnormally bad or the user has exhausted the local cache.

In step 333, as soon as the buffer allows, play the new target song while it is being downloaded. At the same time, update step 300 by deleting outdated pre-cached files (i.e. the pre-cached portions of the songs prior to the new target song) and pre-buffering the subsequent songs. This step is important because it helps the user to return to the none-interruption loop.

Assuming the user does not to skip again while the new target song is playing, go to step 335 which includes the sub-steps of:

as soon as the playing of the new target song ends, play the first small portion of the next song subsequent to the new target song;

at the same time, download the rest of the "next song" (beginning from the ten seconds mark, for example); and update step 300, wherein if one or more songs subsequent to this "next song" are already pre-cached, skip them and download the subsequent ones, executively, to make up designated number.

Then, in step 336, play the rest of the "next song" as soon as the pre-cached portion ends.

If the user wants to skip again, the loop starting at step 300A will be repeated.

Figure 4:
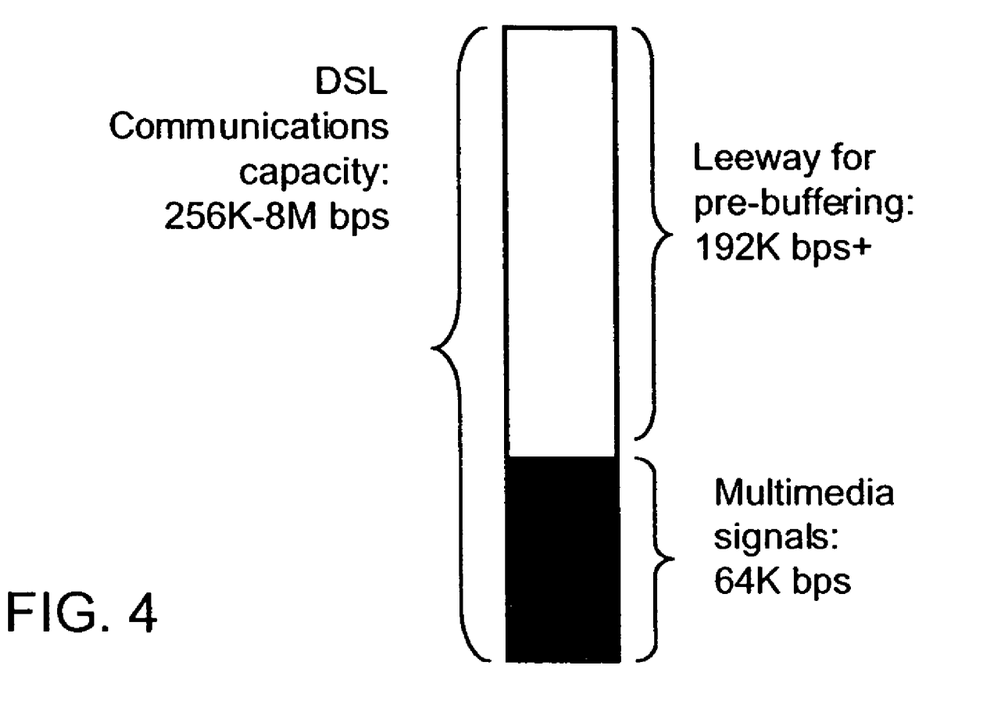
FIG. 4 is a schematic diagram illustrating the data capacity of a communications channel being shared by the streaming for playing a song and the streaming for downloading.

The pre-caching (i.e. the pre-buffering) solution described above is possible because the total capacity of the communication channel can be shared between several independent data streams using some kind of multiplexing, in which, each stream's data rate may be limited to a fixed fraction of the total capacity. As it is illustrated in FIG. 4, the data transfer rate for a regular DSL communications channel ranges from 256K to 8 M byte per second (bps), the voice conversations and music signals only use 64K bps. Therefore, the streaming track for the downloading data for pre-buffering can use the rest of the capacity.

The solution described above can also be used in Internet based video service and any other services where an initial buffering time is needed before the first section of the downloaded data can be read.

In the preferred embodiment of the invention, the first small portion is approximately the first ten seconds of the song. This solution is advantageous because ten seconds of pre-buffering complies with various royalty requirements such that if the user skips before the ten seconds pre-buffered portion is played, a royalty is not accessed for listening to the song. In addition, avoiding of downloading the entire next song conserves bandwidth and memory.

In view of the different possible embodiments to which the principle of this invention may be applied, it should be recognized that the preferred embodiment described herein with respect to the drawings is meant to the illustrative only and should not be taken as limiting the scope of the invention. One skilled in the art will readily appreciate that other applications may be substituted for those set forth herein without departing from the spirit and scope of the present invention.

Accordingly, the invention should only be limited by the claims included below.

The invention claimed is:

1. An apparatus for playing a pre-determined sequence of content segments, comprising:

a processor; and a memory that stores at least one control program usable by the processor to control the playing of a predetermined sequence of content segments, and wherein the apparatus is configured to:

in response to initiation of play of a content segment, initiate downloading to a pre-buffer cache of a portion of each of a number of content segments which are, in the pre-determined sequence, subsequent to the playing content segment;

in response to skipping to a target content segment of the predetermined sequence of content segments whose portion has been downloaded to the pre-buffer cache, initiate play of the downloaded portion of the target content segment; and to while playing the downloaded portion of the target content segment, initiate downloading of the rest of the target content segment, wherein the pre-determined sequence of content segments is scheduled by a multimedia scheduler configured to schedule content segments for network broadcast, and wherein the multimedia scheduler comprises:

at least one work manager for each of a plurality of channels serviced, the work manager including at least one producer thread, a task queue and at least one worker thread; and one or more scheduler objects associated with each producer thread, wherein the work manager and associated scheduler objects create and maintain a broadcast schedule for each of the channels according to predefined criteria, wherein said at least one producer thread checks a channel at configurable intervals and increments the channel's schedule by generating a work request and placing it in the task queue, wherein the worker threads execute the work requests, and wherein the multimedia scheduler is scalable to service the plurality of broadcast channels and/or services simultaneously.

2. The apparatus of claim 1, wherein the portion of the target content segment is approximately the data of the first ten seconds of the target content segment.

3. The apparatus of claim 1, wherein the number of portions of content segment to cache in advance is five.

4. The apparatus of claim 1, wherein the number of portions of content segments to cache in advance is all content segments in the pre-determined sequence of content segments that are subsequent to the playing content segment.

5. The apparatus of claim 1, wherein the pre-buffer cache follows a first-in first-out algorithm and allows writing while reading.

6. A method for playing a pre-determined sequence of content segments, comprising:

in response to initiation of play of a a content segment on the local computer, downloading to the local computer a portion of each of a number of content segments which are, in the pre-determined sequence, subsequent to the playing content segment;

pre-caching the downloaded portions in a pre-buffer cache of the local computer;

in response to skipping from a playing content segment to a target content segment, checking whether the portion for the target content segment is in the pre-buffer cache; and if the portion of the target content segment is in the pre-buffer cache, initiating play of the portion of the target content segment from the pre-buffer cache, wherein the pre-determined sequence of content segments was pre-scheduled for network broadcast on one of a plurality of channels, including:

creating and maintaining, by a work manager and associated scheduler objects, a broadcast schedule for each of the channels according to predefined criteria;

checking, by at least one producer thread, the broadcast schedule for each of the channels at configurable intervals;

incrementing, by at least one producer thread, the broadcast schedule for each of the channels by generating a work request and placing the work request in a task queue; and executing, by worker threads, the work requests.

7. The method of claim 6, further comprising:

downloading at least another portion of the target content segment that is not in the pre-puffer cache; and playing the other portion of the target content segment.

8. The method of claim 7, further comprising:

if the portion of the target content segment is in the pre-buffer cache, downloading, consecutively, a portion of each of a number of content segments which are, in the pre-determined sequence, subsequent to the target content segment, wherein if portions of the one or more content segments subsequent to the target content segments are already in the pre-buffer cache, skipping the downloading of the portions of the one or more content segments already having portions in the pre-buffer cache and downloading the portions of the subsequent content segments such that portions of each of the number of content segments are downloaded to the pre-buffer cache.

9. The method of claim 8, further comprising:

if no skip command is received while the target content segment is playing, as the playing of the target content segment ends, playing the content segment immediately subsequent to the target content segment; and if a skip command is received while the target content segment is playing checking whether the beginning portion of the content segment immediately subsequent to the target content segment is in the pre-buffer cache.

10. The method of claim 7, wherein if the beginning portion of the target content segment is not in the pre-buffer cache, the method, further comprised:

sending a request to stop transmitting the playing content segment and to start transmitting the target content segment and at least substantially simultaneously:

deleting the any content segment which precedes the target content segment in the pre-determined sequence of content segments from the pre-buffer cache;

downloading at least a remaining portion of the target content segment; and begin playing the target content segment after a sufficient portion of the target content segment has been downloaded.

11. The method of claim 10, further comprising:

if playback is skipped from the target content segment to another target content segment, checking whether the portion of the other target content segment is in the pre-buffer cache; and if playback is not skipped from the target content segment, playing portion of the content segment subsequent to the target content segment after the end of the target content segment is played and downloading at least a portion of the target content segment which is not in the pre-buffer cache, wherein if portions of the one or more content segments subsequent to the content segments in the pre-determined sequence of content segments are already in the pre-buffer cache, skipping the downloading of the beginning portions of the one or more content segments already having beginning portions in the pre-buffer cache and downloading the beginning portions of the subsequent content segments such that portions of each of the number of content segments are downloaded to the pre-buffer cache.

12. The method of claim 6, wherein the portion of the target content segment is approximately the data of the first ten seconds of the target content segment.

13. The method of claim 6, wherein the number of portions of content segments to cache in advance is five.

14. The method of claim 6, wherein the number of portions of content segments to cache in advance is all content segments in the pre-determined sequence of content segments that are subsequent to the playing content segment.

15. The method of claim 6, wherein the pre-buffer cache follows a first-in first-out algorithm and allows writing while reading.

16. A computer-readable storage medium, having instructions stored thereon that, if executed by a computing device, cause the computing device to perform operations for playing a predetermined sequence of content segments, comprising:

in response to initiation of play of a content segment on the computing device, downloading to the computing device, consecutively, a portion of each of a number of content segments which are, in the pre-determined sequence, subsequent to the playing content segment;

pre-caching the downloaded portions in a pre-buffer cache of the computing device;

in response to skipping from a playing content segment to a target content segment, checking whether the portion for the target content segment is in the pre-buffer cache; and if the portion of the target content segment is in the pre-buffer cache, initiating play of the portion of the target content segment from the pre-buffer cache, wherein the pre-determined sequence of content segments was pre-scheduled for network broadcast on one of a plurality of channels, including:

creating and maintaining, by a work manager and associated scheduler objects, a broadcast schedule for each of the channels according to predefined criteria;

checking, by at least one producer thread, the broadcast schedule for each of the channels at configurable intervals;

incrementing, by at least one producer thread, the broadcast schedule for each of the channels by generating a work request and placing the work request in a task queue; and executing, by worker threads, the work requests.

17. The computer-readable storage medium of claim 16, wherein the operations further comprise:

downloading at least another portion of the target content segment that is not in the pre-puffer cache; and playing the other portion of the target content segment.

18. The computer-readable storage medium of claim 17, wherein the operations further comprise:

if the portion of the target content segment is in the pre-buffer cache, downloading, consecutively, a portion of each of a number of content segments which are, in the pre-determined sequence, subsequent to the target content segment, wherein if portions of the one or more content segments subsequent to the target content segment are already in the pre-buffer cache, skipping the downloading of the portions of the one or more content segments already having portions in the pre-buffer cache and downloading the portions of the subsequent content segments such that portions of each of the number of content segments are downloaded to the pre-buffer cache.

19. The computer-readable storage medium of claim 18 wherein the operations further comprise:

if no skip command is received while the target content segment is playing, as the playing of the target content segment ends, playing the content segment immediately subsequent; and if a skip command is received while the target content segment is playing checking whether the beginning portion of the content segment immediately subsequent to the content segment is in the pre-buffer cache.

20. The computer-readable storage medium of claim 17, wherein if the beginning portion of the target content segment is not in the pre-buffer cache, the operations further comprise:

sending a request to stop transmitting the playing content segment and to start transmitting the target content segment and at least substantially simultaneously:

deleting the portion of any content segment which is prior to the target content segments in the pre-determined sequence of content segments from the pre-buffer cache;

downloading at least a remaining portion of the target content segment; and begin playing the target content segment after a sufficient portion of the target content segment has been downloaded.

21. The computer-readable storage medium of claim 20, wherein the operations further comprise:

if playback is skipped from the target content segment to another target content segment, checking whether the portion of the other target content segment is in the pre-buffer cache; and if playback is not skipped from the target content segment, playing the portion of the content segment subsequent to the target content segment which is not in the pre-buffer cache and downloading at least a portion of the target content segment which is not in the pre-buffer cache;

wherein if portions of the one or more content segments subsequent to at least a portion of the target content segment are already in the pre-buffer cache, skipping the downloading of the beginning portions of the one or more content segments already having beginning portions in the pre-buffer cache and downloading the beginning portions of the subsequent content segments such that portions of each of the number of content segments are downloaded to the pre-buffer cache.

22. The computer-readable storage medium of claim 16, wherein the portion of the target content segment is approximately the data of the first ten seconds of the target content segment.

23. The computer-readable storage medium of claim 16, wherein the number of portions of content segments to cache in advance is five.

24. The computer-readable storage medium of claim 16, wherein the number of portions of content segments to cache in advance is all content segments in the pre-determined sequence of content segments that are subsequent to the playing content segment.

25. The computer-readable storage medium of claim 16, wherein the pre-buffer cache follows a first-in first-out algorithm and allows writing while reading.

26. The apparatus of claim 1, wherein the number of content segments that are to be downloaded to the pre-buffer cache and a size of the pre-buffer cache are configurable via a function call.

27. The apparatus of claim 1, wherein the number of content segments that are to be downloaded to the pre-buffer cache and the length of each of the portions are configurable via a function call.

28. The apparatus of claim 1, wherein the control program is further configured to delete the portions of each of the number of content segments.

29. The apparatus of claim 1, wherein the content segments include songs and/or videos.

* * * * *

UNITED STATES PATENT AND TRADEMARK OFFICE
CERTIFICATE OF CORRECTION

| | | |
|---|---|---|
| PATENT NO. | : 7,797,064 B2 | |
| APPLICATION NO. | : 10/688423 | |
| DATED | : September 14, 2010 | |
| INVENTOR(S) | : Stephen Loomis et al. | |

It is certified that error appears in the above-identified patent and that said Letters Patent is hereby corrected as shown below:

Title Page, item (56) page 2, column 2, line 24, "Weber et al." should read --Van Wie et al.--.

Column 9, line 31, "play of a a content" should read --play of a content--.

Column 12, line 24, "the pre-buffer cache;" should read --the pre-buffer cache,--.

At column 9, line 61, "in the pre-puffer cache;" should read --in the pre-buffer cache;--.

At column 11, line 34, "in the pre-puffer cache;" should read --in the pre-buffer cache;--.

Signed and Sealed this
Twenty-second Day of February, 2011

David J. Kappos
*Director of the United States Patent and Trademark Office*